United States Patent
Ivankovic et al.

(10) Patent No.: US 9,293,998 B2
(45) Date of Patent: Mar. 22, 2016

(54) BUCK-FLYBACK CONVERTER

(71) Applicant: Infineon Technologies Austria AG, Villach (AT)

(72) Inventors: Mladen Ivankovic, Oakville (CA); Fred Sawyer, Foxboro, MA (US)

(73) Assignee: Infineon Technologies Austria AG, Villach (AT)

( * ) Notice: Subject to any disclaimer, the term of this patent is extended or adjusted under 35 U.S.C. 154(b) by 262 days.

(21) Appl. No.: 13/690,388

(22) Filed: Nov. 30, 2012

(65) Prior Publication Data

US 2014/0153295 A1 Jun. 5, 2014

(51) Int. Cl.
*H02M 3/335* (2006.01)
*H02M 3/337* (2006.01)

(52) U.S. Cl.
CPC .......... *H02M 3/3353* (2013.01); *H02M 3/3372* (2013.01); *H02M 3/3378* (2013.01); *H02M 3/33507* (2013.01); *H02M 3/33523* (2013.01); *Y02B 70/1433* (2013.01)

(58) Field of Classification Search
USPC ....................................................... 363/15–22
See application file for complete search history.

(56) References Cited

U.S. PATENT DOCUMENTS

| | | | | |
|---|---|---|---|---|
| 4,754,385 A * | 6/1988 | McDade et al. | | 363/16 |
| 5,734,562 A * | 3/1998 | Redl | | 363/16 |
| 6,191,537 B1 * | 2/2001 | Celso | | 315/219 |
| 7,199,643 B2 * | 4/2007 | Nalbant | | 327/538 |
| 7,881,076 B2 * | 2/2011 | Yang | | 363/21.06 |
| 8,451,632 B2 * | 5/2013 | Yang et al. | | 363/21.12 |
| 8,767,417 B2 * | 7/2014 | Lin et al. | | 363/21.12 |
| 2007/0242487 A1 * | 10/2007 | Orr | | 363/21.12 |
| 2010/0202163 A1 * | 8/2010 | Yang et al. | | 363/21.12 |
| 2010/0232182 A1 * | 9/2010 | Yang et al. | | 363/20 |
| 2010/0284204 A1 * | 11/2010 | Mayell | | 363/37 |
| 2012/0299503 A1 * | 11/2012 | Aharon | | 315/224 |

FOREIGN PATENT DOCUMENTS

| | | |
|---|---|---|
| CN | 102761276 A | 10/2012 |
| DE | 69626743 T2 | 2/2004 |

* cited by examiner

*Primary Examiner* — Timothy J Dole
*Assistant Examiner* — Bryan R Perez
(74) *Attorney, Agent, or Firm* — Murphy, Bilak & Homiller, PLLC

(57) ABSTRACT

A two-transistor flyback converter includes a transformer having a primary side and a secondary side, a first transistor connected between an input voltage source and a first terminal of the primary side, a second transistor connected between ground and a second terminal of the primary side, and a diode directly connected between the first terminal of the primary side and ground. The first and second transistors are operable to switch on and off simultaneously and with no current return from the primary side to the input voltage source when the input voltage source is less than a reflected voltage from the secondary side.

6 Claims, 4 Drawing Sheets

BUCK-FLYBACK CONVERTER

TECHNICAL FIELD

The present application relates to flyback converters, in particular two-transistor flyback converters.

BACKGROUND

The flyback converter is used in both AC/DC and DC/DC conversion with galvanic isolation between the input and output. The flyback converter is a buck-boost converter with the inductor split to form a transformer, so that the voltage ratios are multiplied with an additional advantage of isolation. A switch is used to enable energy transfer from the input voltage source to the transformer. When the switch is closed, the primary side of the transformer is directly connected to the input voltage source. The primary side current and magnetic flux in the transformer increases, storing energy in the transformer. The corresponding voltage induced in the secondary side is negative, so the diode connecting the secondary side to the load is reverse-biased. The output capacitor supplies energy to the output load. When the switch is opened, the primary side current and magnetic flux drops. The secondary side voltage becomes positive, forward-biasing the diode and allowing current to flow from the transformer. The energy from the transformer core recharges an output capacitor and supplies the load.

A very high inductive kickback (reflected voltage) occurs when the switch turns off, placing a great deal of voltage strain on the transistor. This voltage strain can be reduced by using two transistors in the flyback converter. Doing so can prevent the voltage across either switch from exceeding the input voltage level. Conventional two-transistor flyback converters have an RCD (resistor-capacitor-diode) network in the diode return path from the source of the high-side transistor to ground. The high-side transistor is switchable for connecting the input voltage source to the primary side of the transformer. The capacitor of the RCD network charges to the difference between the transformer reflected voltage and the input voltage, and prevents current flow from the transformer back to the input source. However, additional switching losses occur due to the charging and discharging of the capacitor that is part of the RCD network. Also, the voltage on the high-side transistor exceeds the input voltage. When such a topology is used as a power factor correction unit, the input voltage changes from zero to a certain voltage and power loss created by the capacitor of the RCD network becomes substantial.

SUMMARY

According to the embodiments described herein, a two-transistor flyback converter topology is described which can operate efficiently when the input voltage is lower than the reflected voltage of the transformer. In one embodiment, the two-transistor flyback converter is used as a power factor correction circuit.

According to an embodiment of a two-transistor flyback converter, the converter comprises a transformer having a primary side and a secondary side, a first transistor connected between an input voltage source and a first terminal of the primary side, a second transistor connected between ground and a second terminal of the primary side, and a diode directly connected between the first terminal of the primary side and ground. The first and second transistors are operable to switch on and off simultaneously and with no current return from the primary side to the input voltage source when the input voltage source is less than a reflected voltage from the secondary side.

According to an embodiment of a method of operating a two-transistor flyback converter including a transformer with a primary side and a secondary side, the method comprises: simultaneously switching on a first transistor connected between an input voltage source and a first terminal of the primary side, and a second transistor connected between ground and a second terminal of the primary side to energize the transformer through the primary side; simultaneously switching off the first and second transistors to transfer the energy stored in the transformer to a load connected to the secondary side; and connecting the first terminal of the primary side to ground only through a diode when the first and second transistors are switched off and with no current return from the primary side to the input voltage source when the input voltage source is less than a reflected voltage from the secondary side.

According to an embodiment of a two-transistor flyback converter, the converter comprises a transformer having a primary side and a secondary side, a first MOSFET (metal-oxide-semiconductor field-effect transistor) having a drain connected to an input voltage source and a source connected to a first terminal of the primary side, and a second MOSFET having a drain connected to a second terminal of the primary side and a source connected to ground. The primary side is decoupled from the input voltage source by only the first MOSFET and energy is transferred to the secondary side independent of the primary side voltage when the first and second MOSFETs are switched off.

According to an embodiment of a method of operating a two-transistor flyback converter including a transformer with a primary side and a secondary side, the method comprises: switching on a first MOSFET having a drain connected to an input voltage source and a source connected to a first terminal of the primary side, and a second MOSFET having a drain connected to a second terminal of the primary side and a source connected to ground to energize the secondary side through the primary side; switching off the first and second MOSFETs to transfer the energy stored in the transformer to a load connected to the secondary side; decoupling the primary side from the input voltage source by only the first MOSFET when the first and second MOSFETs are switched off; and transferring energy from the primary side to the secondary side independent of the primary side voltage when the first and second MOSFETs are switched off.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
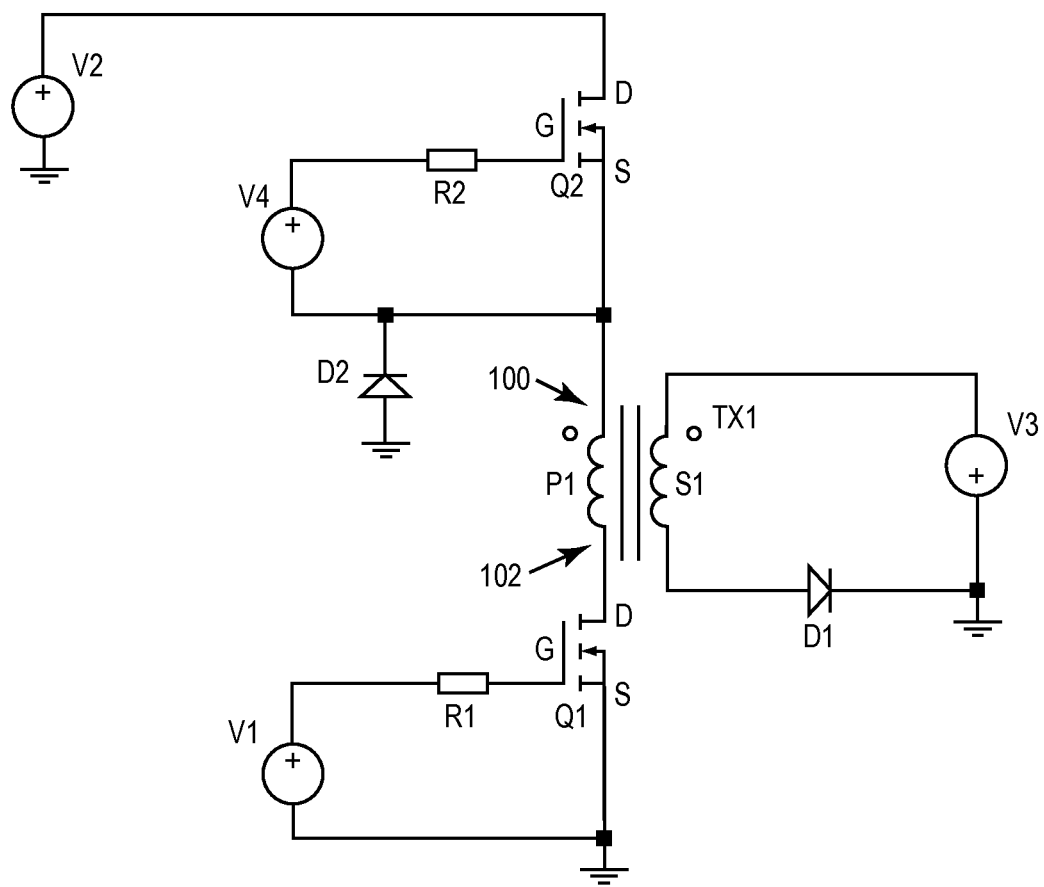
FIG. 1 illustrates a circuit diagram of an embodiment of a two-transistor flyback circuit.

FIG. 1 illustrates an embodiment of a two-transistor flyback converter. The flyback converter includes a transformer (TX1) having a primary side (P1) and a secondary side (S1), a transistor Q2 connected between an input voltage source (V2) and a first terminal 100 of the primary side, and a transistor Q1 connected between ground and a second terminal 102 of the primary side P1. The transistors Q1 and Q2 switch on and off simultaneously in response to input signals provided to the gates (G) of the transistors Q1 and Q2. The gate input sources are illustrated schematically as voltage sources V1 and V4 in FIG. 1, respectively. The gate input sources V1 and V4 can be connected to the corresponding transistors Q1 and Q2 through respective resistors R1 and R2.

When the transistors Q1 and Q2 are closed (i.e., switched on), the primary side P1 of the transformer TX1 is directly connected to the input voltage source V2. The primary side current and magnetic flux in the transformer TX1 increases, storing energy in the transformer TX1. The corresponding voltage induced in the secondary side S1 is negative, so a diode D1 connecting the secondary side S1 to the load is reverse-biased. The load is illustrated schematically as voltage source V3 in FIG. 1. When the transistors Q1 and Q2 are opened (i.e. switched off), the primary side current and magnetic flux in the transformer TX1 drops. The secondary side voltage becomes positive, forward-biasing diode D1 and allowing current to flow from the transformer. The energy from the transformer core recharges an output capacitor (not shown) and supplies the load.

In one embodiment, transistors Q1 and Q2 are MOSFETs (metal-oxide-semiconductor field-effect transistors). The drain (D) of MOSFET Q2 is connected to the input voltage source V2 and the source (S) of Q2 is connected to the first terminal 100 of the primary side P1 of the transformer TX1. The drain (D) of MOSFET Q1 is connected to the second terminal 102 of the primary side P1 and the source (S) of Q1 is connected to ground. Since there is no diode connecting the input voltage source V2 to the drain of transistor Q1 as is otherwise conventionally done, the primary side P1 is decoupled from the input voltage source V2 by only MOSFET Q2 and energy transfers to the secondary side S1 independent of the primary side voltage when MOSFETs Q1 and Q2 are switched off; that is, the input voltage is decoupled from the reset phase of the flyback converter. As such, energy is transferred from the transformer TX1 to the secondary side S1 at all times completely independent of the primary voltage.

A diode D2 can be directly connected between ground and the first terminal 100 of the primary side P1. That is, no capacitor or resistor is included in the diode path from the first terminal 100 of the primary side P1 to ground. As a result, there is no current return from the primary side P1 of the transformer TX1 to the input voltage source V2 when the input voltage source V2 is less than the reflected voltage (Vr) from the secondary side S1. Transistor Q2 is exposed to the input voltage (V2) and transistor Q1 is exposed to the reflected voltage (Vr) plus a spike voltage (Vspike) caused by the leakage inductance of the transformer TX1. The transformer reflected voltage Vr is a design parameter, and can be chosen in the way that summed together with the spike voltage Vspike is smaller than the input voltage. In other words, the input voltage source V2 is greater than Vr+Vspike according to an embodiment.

Both transistors Q1 and Q2 are exposed to the maximum input voltage (V2), and at the same time power transfer is independent from the input voltage. Such a configuration is well-suited for power factor correction applications where the input current waveform follows that of the input voltage, thus realizing a good power factor.

Transistor Q2 and diode D2 operate as a buck converter, and transistor Q1 operates as a flyback converter. That is, transistor Q2 is implemented as a buck-type switch so that the maximum voltage across transistor Q2 is limited to the maximum input voltage (V2). Hence the first terminal 100 of the transformer primary side P1 is connected to ground during the off-phase of transistor Q2. Transistor Q1 is implemented as a flyback-type switch, connecting the second terminal 102 of the transformer primary side P1 to ground during the on-phase of transistor Q1. During the off-phase of transistor Q1, Q1 is exposed to the transformer reflected voltage (Vr) plus the spike voltage (Vspike). This sum is controlled by design and can be set in the way that the breakdown voltage of transistor Q1 is greater than Vr+Vspike according to an embodiment.

Figure 2:
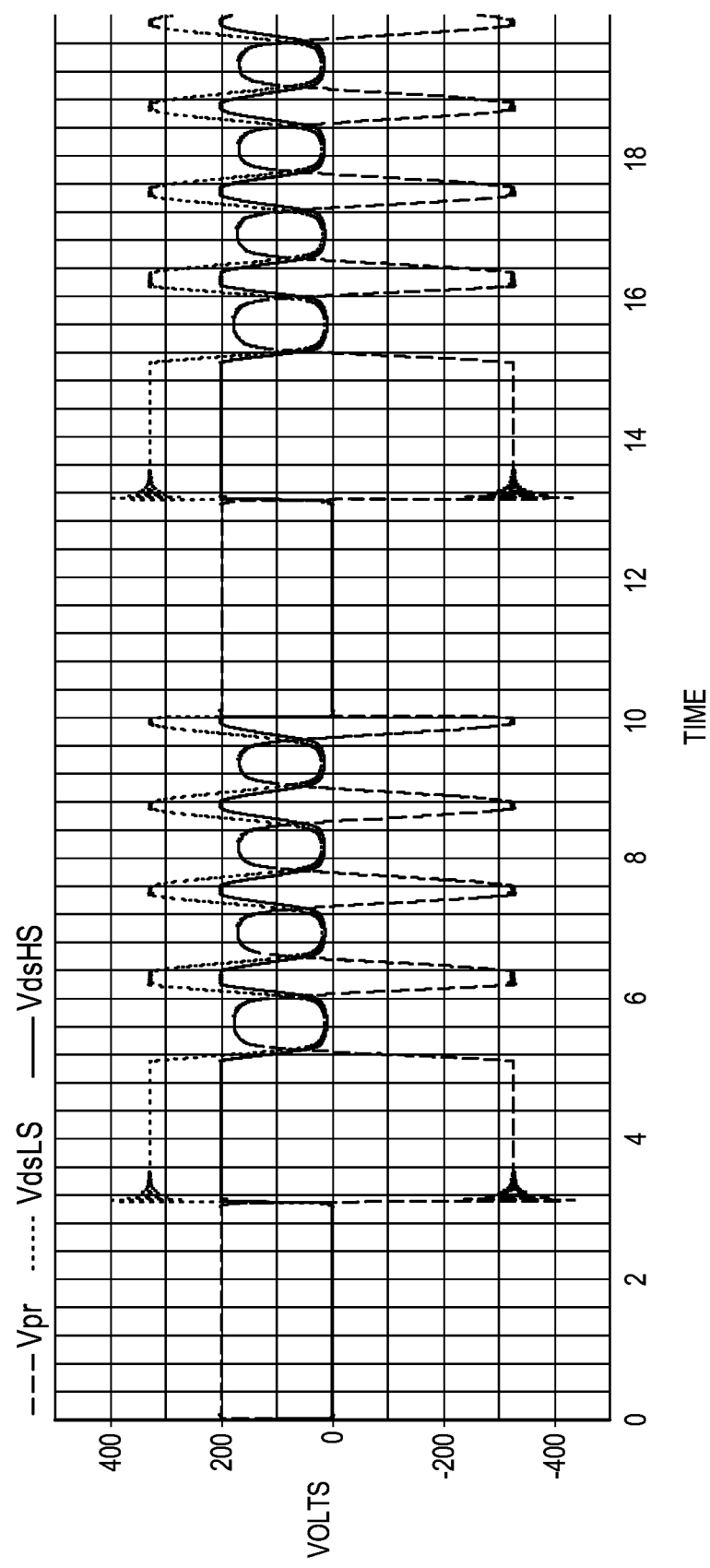
FIG. 2 illustrates a plot diagram of different voltage waveforms during operation of the two-transistor flyback circuit.
Figure 3:
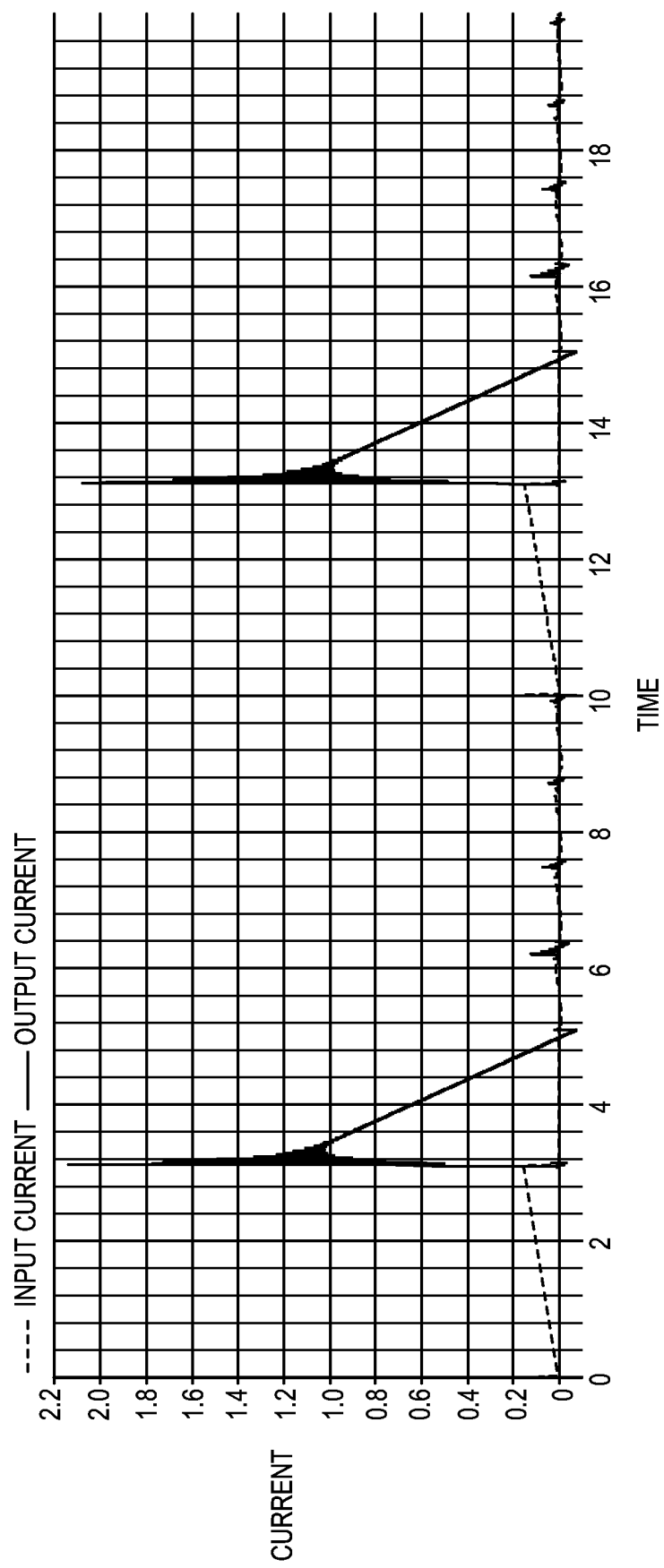
FIG. 3 illustrates a plot diagram of input and output current waveforms during operation of the two-transistor flyback circuit.

FIG. 2 illustrates a plot diagram of the drain-to-source voltage (VdsLS) of transistor Q1, the drain-to-source voltage (VdsHS) of transistor Q2, and the primary side voltage (Vpr) of the transformer TX1 during operation of the two-transistor flyback converter of FIG. 1. FIG. 3 illustrates a plot diagram of the corresponding input and output currents of the flyback converter when the input voltage (V2) is less than the output voltage (Vout) multiplied by the turn ratio (n) of the transformer TX1 (where Vr=Vout*n).

Transistors Q1 and Q2 switch on and off simultaneously. When Q1 and Q2 are on, VdsLS and VdsHS essentially equal zero (ignoring the inherent voltage drop of the transistors), and Vpr equals the input voltage (e.g. 200V in FIG. 2 for this purely illustrative example). When Q1 and Q2 are off, Vpr becomes negative and has a magnitude equaling the secondary side reflected voltage (Vr) plus the spike voltage (Vspike) caused by the leakage inductance of the transformer TX1. Energy from the transformer leakage inductance transfers to the drain-source capacitance of transistor Q2, creating a spike on top of the reflected voltage. As a result, VdsHS equals the input voltage and VdsLS equals Vpr (i.e. VdsLS=Vr+Vspike) when transistors Q1 and Q2 are switched off. Vspike eventually drops to approximately zero when the leakage inductance fully dissipates. In one embodiment, the breakdown voltage of transistor Q2 is greater than Vr+Vspike to ensure transistor Q2 does not fail under the voltage conditions illustrated in FIG. 2.

Figure 4:
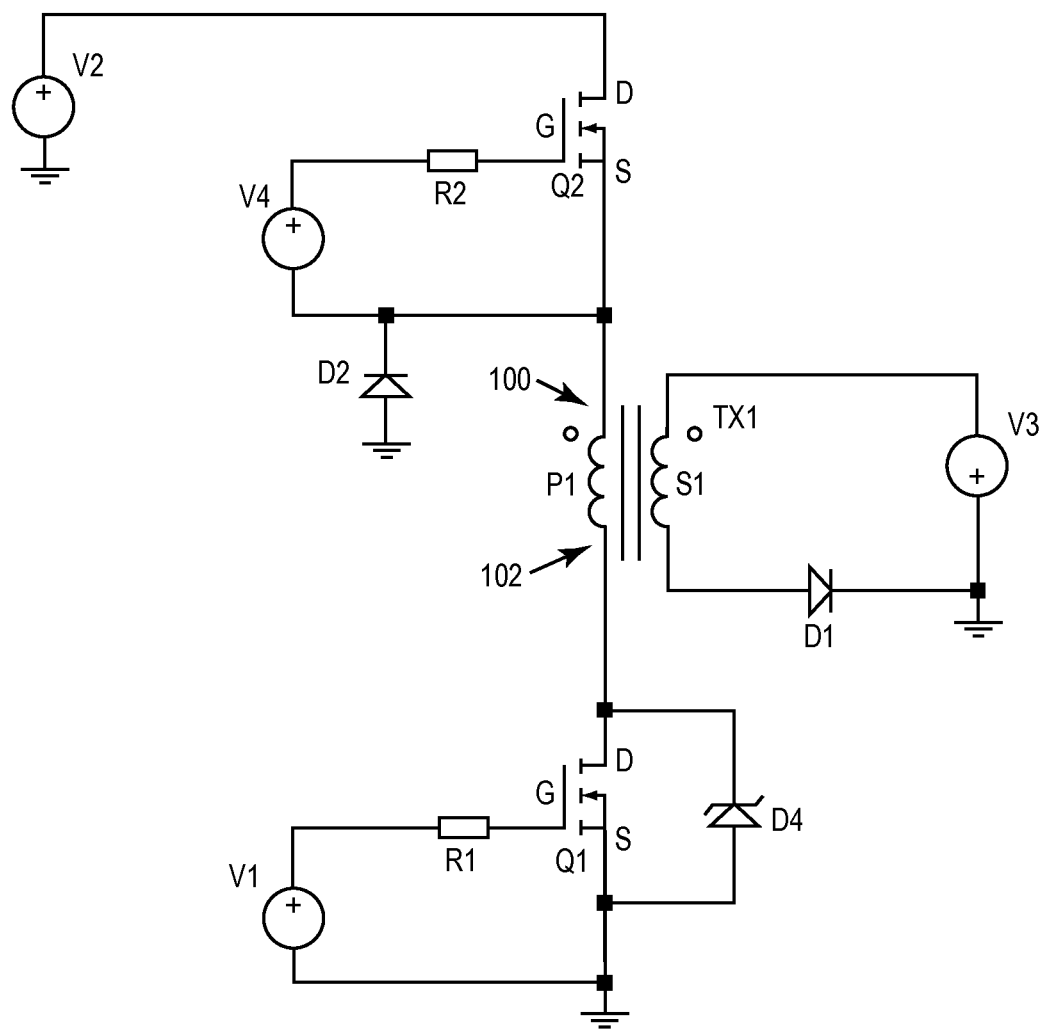
FIG. 4 illustrates a circuit diagram of another embodiment of a two-transistor flyback circuit.

FIG. 4 illustrates another embodiment of a two-transistor flyback converter. The embodiment shown in FIG. 4 is similar to the one shown in FIG. 1, however a Zener diode D4 is connected between the drain (D) and source (S) of transistor Q1. If the energy contained in the leakage inductance of the transformer TX1 is relatively high, Zener diode D4 can be connected in parallel with transistor Q1 as shown. Zener diode D4 acts as a transient voltage suppressor by limiting Vspike to a value less than the breakdown voltage of transistor Q1.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A two-transistor flyback converter, comprising:
    a transformer having a primary side and a secondary side;
    a first transistor connected between an input voltage source and a first terminal of the primary side;
    a second transistor connected between ground and a second terminal of the primary side;
    a diode directly connected between the first terminal of the primary side and ground; and
    wherein the first transistor and the diode are operated as a buck converter,
    wherein the second transistor is operated as a flyback converter,
    wherein the first and second transistors are switched on and off simultaneously and with no current return from the primary side to the input voltage source when the input voltage source is less than a reflected voltage from the secondary side,
    wherein the reflected voltage is set such that a summation of the reflected voltage and a voltage spike caused by leakage inductance of the transformer is smaller than the input voltage.

2. The two-transistor flyback converter according to claim 1, further comprising a Zener diode connected between a drain of the second transistor and a source of the second transistor.

3. The two-transistor flyback converter according to claim 1, wherein a breakdown voltage of the second transistor is greater than the reflected voltage from the secondary side plus the voltage spike caused by leakage inductance of the transformer.

4. A method of operating a two-transistor flyback converter including a transformer with a primary side and a secondary side, the method comprising:
    simultaneously switching on a first transistor connected between an input voltage source and a first terminal of the primary side, and a second transistor connected between ground and a second terminal of the primary side to energize the transformer through the primary side;
    simultaneously switching off the first and second transistors to transfer the energy stored in the transformer to a load connected to the secondary side;
    connecting the first terminal of the primary side to ground only through a diode when the first and second transistors are switched off and with no current return from the primary side to the input voltage source when the input voltage source is less than a reflected voltage from the secondary side;
    setting the reflected voltage such that a summation of the reflected voltage and a voltage spike caused by leakage inductance of the transformer is smaller than the input voltage;
    operating the first transistor and the diode as a buck converter; and
    operating the second transistor as a flyback converter.

5. The method according to claim 4, further comprising limiting the voltage spike caused by leakage inductance of the transformer to a value less than a breakdown voltage of the second transistor by a Zener diode connected between a drain of the second transistor and a source of the second transistor.

6. The method according to claim 4, wherein a breakdown voltage of the second transistor is greater than the reflected voltage from the secondary side plus the voltage spike caused by leakage inductance of the transformer.

* * * * *